Aug. 30, 1932.  J. TAVANI  1,874,241
MOTION PICTURE PROJECTING APPARATUS
Filed Dec. 22, 1927   2 Sheets-Sheet 1
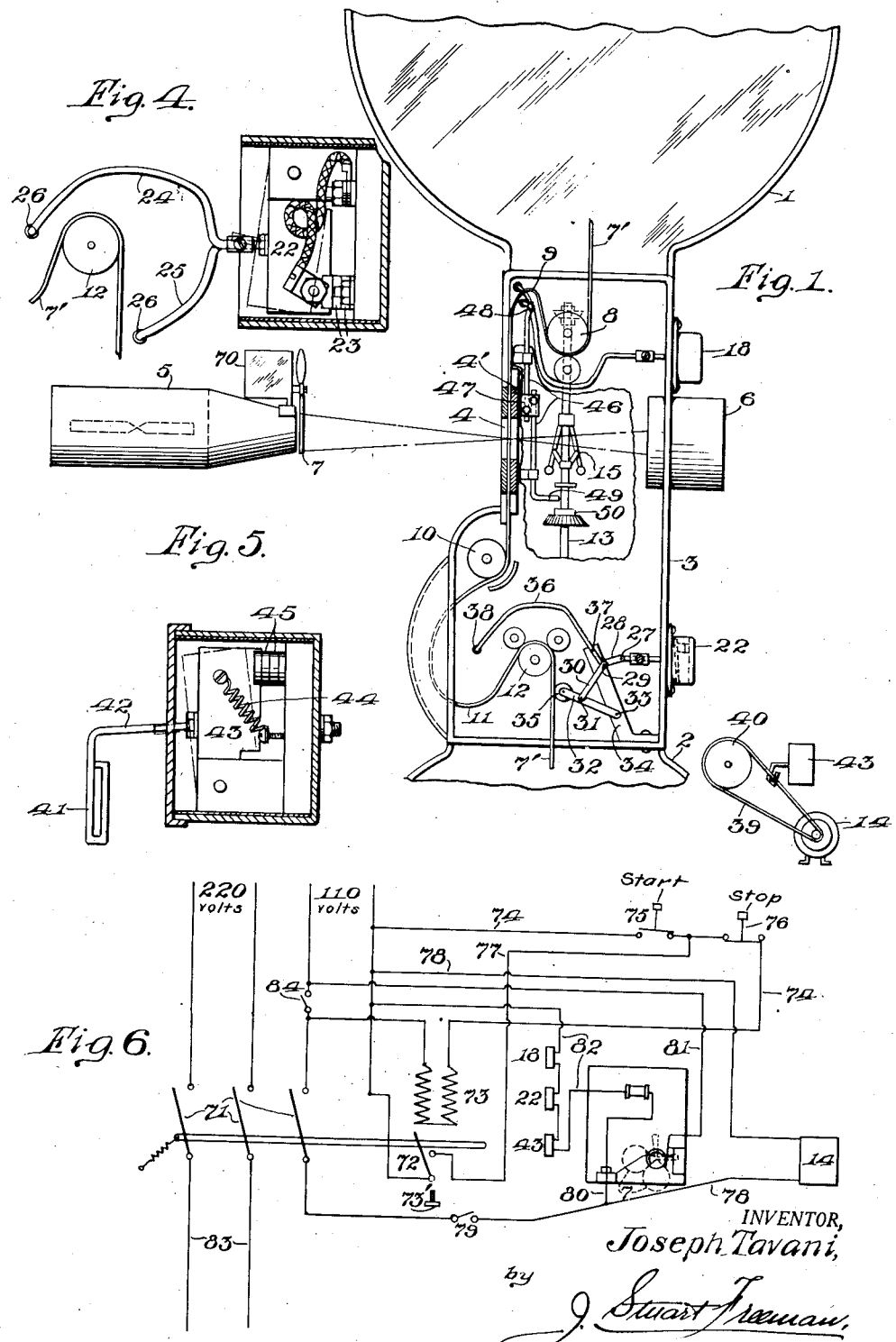
INVENTOR,
Joseph Tavani,
by J. Stuart Freeman,
ATTORNEY.

Aug. 30, 1932.   J. TAVANI   1,874,241
MOTION PICTURE PROJECTING APPARATUS
Filed Dec. 22, 1927   2 Sheets-Sheet 2
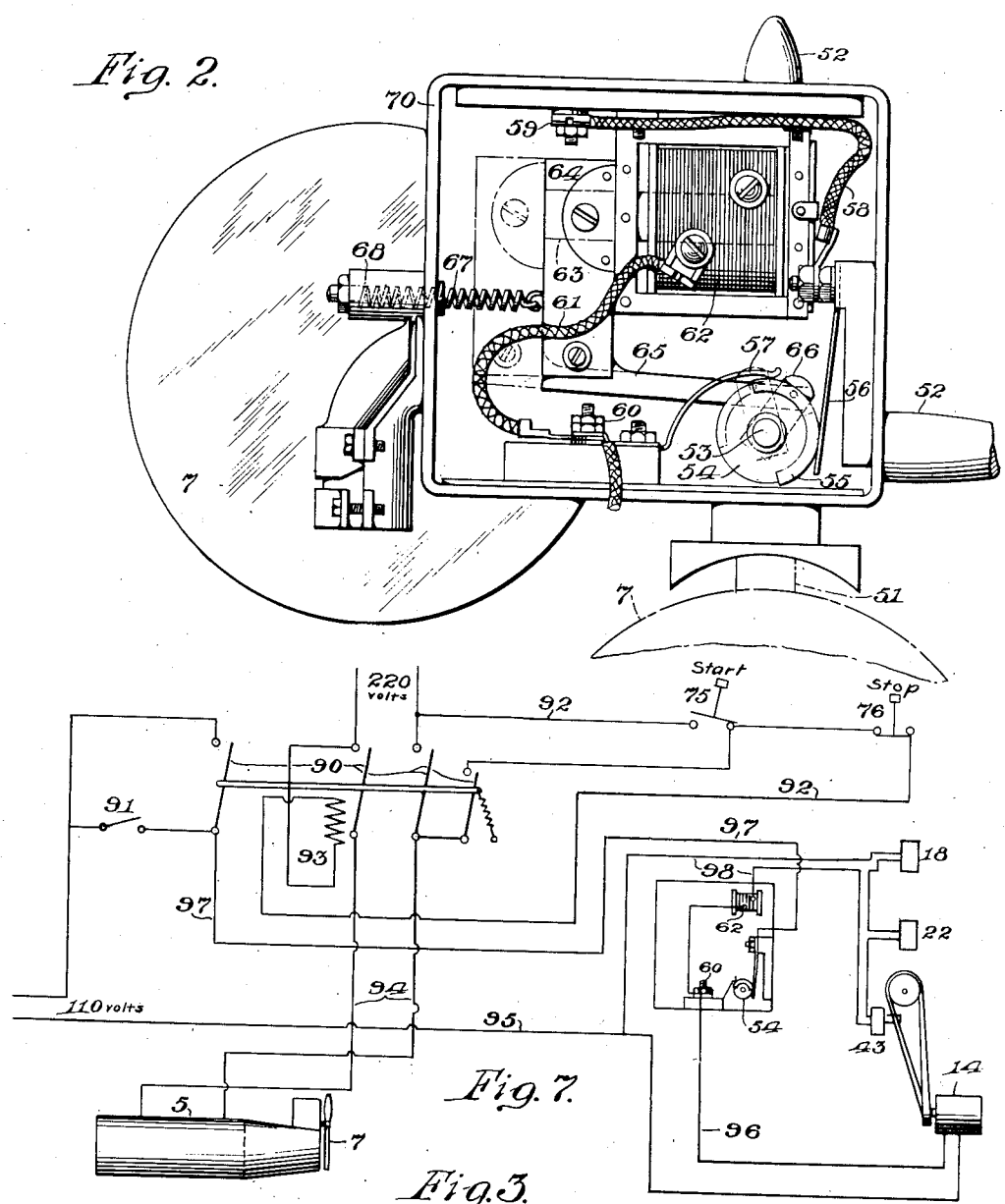
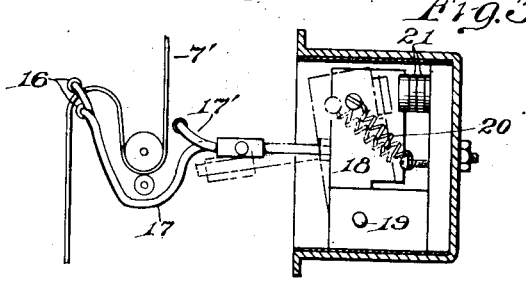
INVENTOR,
Joseph Tavani,
BY
ATTORNEY.

Patented Aug. 30, 1932

1,874,241

UNITED STATES PATENT OFFICE

JOSEPH TAVANI, OF PHILADELPHIA, PENNSYLVANIA

MOTION PICTURE PROJECTING APPARATUS

Application filed December 22, 1927. Serial No. 241,815.

The object of the invention is to provide improvements in motion picture apparatus broadly, and more specifically in means for automatically actuating portions of the device immediately upon the breaking of the film, or the breaking of the driving motor belt, or a decrease in the speed of the motor or film, or other variations from the normal operation of the apparatus.

Another object is to provide suitable connections for the improved system of electric wiring of the several pieces of apparatus, whereby not only are the various elements connected so as to function automatically, but provision is made for manually controlling the operation of certain of said elements in various combinations or independently of one another.

Thus, it is possible to run the film-driving motor from a 110 volt or similar circuit without closing the main switch which runs the light from the 220 volt or other circuit; or it is possible when the main switch is closed and the light is on to start the driving motor merely by manually altering the angular position of the dowser element; or by merely closing a "starting" switch for a moment, it is possible to close the main switch and thereby instantly start the light from the 220 volt circuit and by subsequently actuating the dowser to start the motor in the 110 volt circuit; or by momentarily closing a "stop" switch to cause the main switch to open and thereby close the dowser, stop the motor and shut off the light; or by the breaking or undue slacking of the film, or slowing of the motor, the operation of the motor, dowser and light is automatically effected; together with other details of operation hereinafter clearly apparent.

With these and other objects in mind, the invention comprises further novel details which are fully brought out in the following description, when read in conjunction with the accompanying drawings, in which Fig. 1 is a fragmentary portion of a motion picture projecting apparatus including portions of the intercooperating elements going to make up the invention; Fig. 2 is an enlarged fragmentary portion of the dowser and actuating mechanism; Fig. 3 is an enlarged detail of one of the switches actuated by and upon the breaking of the film; Fig. 4 is a similar view of another such switch but of a slightly modified arrangement over the corresponding switch shown in Fig. 1; Fig. 5 is a similar view of a switch adapted to be actuated by and upon the breaking of the motor belt; Figs. 6 and 7 are wiring diagrams showing the proper interconnection of the elements when employing two different types of main switches.

Referring to the drawings, there is shown in Fig. 1, a portion of a motion picture projecting device, embodying a casing which comprises an upper section 1 designed to contain a reel of unexposed film 7', a lower section 2 designed to contain a reel upon which the film is wound after having been exposed, and an intervening section 3 having an inlet aperture 4 through which light rays shine from the arc or other lamp 5, said rays of light thereafter passing from the device through a lens-supporting frame 6. The emission of light rays from the lamp 5 is controlled by and in accordance with the position of the enlarged target or blade 7, which will be hereinafter referred to as the dowser, and which is actuated by mechanism hereinafter described.

Film leaving the compartment 1 passes around a suitable roller 8 and thereafter enters a reversely directed loop 9, whence it passes downwardly past the aperture 4 and over a suitable roller 10 and into a downwardly extending loop 11 which terminates over a roller 12, from which the film passes into the lower compartment 2 of the apparatus. The rollers 10 and 12 are driven in any suitable manner as by spur gearing or the like from a shaft 13, which is actuated by a motor 14 (shown diagrammatically) and the speed of which is controlled by any suitable form of governor mechanism 15.

As the film 7' moves through the loop 9, it passes between a pair of laterally extending spaced arms 16 (see Fig. 3) which are carried by a looped arm 17 connected to and extending outwardly from a switch member 18, pivoted at 19 and yieldingly maintained by a spring 20 in such position that separable contacts 21 are normally in engagement. To the looped arms 17 there may be also secured one or more additional arms 17', positioned adjacent to another portion of the path of the film 7', the arms 16 and 17' being so designed, adjusted, and positioned that the film, if broken above the roller 8 or between the roller 8 and the guide 4' adjacent to the aperture 4, will be thrown against one of said arms of the switch 18 and momentarily break the engagement of the contacts 21 with a result hereinafter described.

In the lower portion of the intermediate section 3 of the apparatus, a switch 22 is shown of the construction illustrated in Fig. 4 and comprising a pair of normally cooperating contacts 23 maintained together by gravity or by means of a spring if desired, said switch being provided with a pair of diverging, oppositely curved arms 24 and 25 which are provided respectively with laterally extending off-sets 26, normally positioned in relatively close relationship, yet out of direct contact, with the passing film 7' both before and after it passes over the roller 12, so that a breaking of the film between or in the neighborhood of the rollers 10 and 12 will permit the loose end of the film to strike against the off-sets 26 and momentarily break the cooperation of the contacts 23 with a result also hereinafter described.

In Fig. 1, the switch 22 is illustrated as being pivotally connected at 27 to a link 28, which at 29 is pivotally connected to a link 30 in turn pivotally connected at 31 to an arm 32 pivotally supported at 33 by a bracket 34 and carrying a rotatable roller 35 which bears lightly against the downwardly extending portion of the film 7' as it passes from the roller 12 towards and into the lower section 2 of the apparatus. An arm 36 pivotally mounted at 37 upon the upper free end portion of the bracket 34 is also pivotally connected at 29 to the links 28 and 30 and at its outer free end is provided with a laterally extending off-set 38 which is so positioned in and with respect to the loop 11 of the film that breaking of the film between the rollers 10 and 12 will strike against said off-set 38, causing the arm 36 to move upwardly and thereby actuating the switch 22 to break the contacts therein. Similarly, breaking of the film against the roller 12 permits the arm 32 to drop and either independently of or in cooperation with the arm 36 also cause the breaking of the contacts of said last-named switch 22.

The motor 14 through the medium of a belt 39 drives a pulley 40, which is connected in any suitable manner with the shaft 13 representing the direct driving or propelling means for properly moving the film 7'; said belt normally passing slidably through and free from contact with the sides of a loop 41 of an arm 42, carried by a switch 43 normally maintained by a spring 44 in such position that a pair of contacts 45 are in cooperation, in Fig. 1 the diagrammatical switches 18, 22 and 43 corresponding with the switches shown in detail in Figs. 3, 4 and 5.

In addition to means hereinafter described for stopping the motor 14 upon the breaking of the film 7', there is provided a means for instantly stopping the operation of the driving mechanism represented by the shaft 13 and governor 15, said means comprising a pair of rods 46, adjustably connected together by a clamp 47 to vary their overall length, the free end 48 of the upper of said rods engaging the arm 17 of a switch 18 in any suitable manner so that immediately upon the breaking of the film in the neighborhood of the roller 8, or between said roller and the film guide 4', said rods are abruptly forced downwardly so that the angularly extending offset 49 of the lower rod cooperates with the collar 50 carried by the shaft 13 and thereby immediately serves to break or arrest the motion of the film driving mechanism.

Referring to Fig. 2, the dowser 7 is carried by an arm 51, the opposite end of which comprises a handle 52, said arm being pivotally mounted upon a trunnion 53 which also carried a commutator 54, having a segmental contact portion 55 against which is adapted to slidably bear in electrical contact the leaf springs 56 and 57, the former contact spring being connected by a wire 58 to a binding post 59, while the latter of said contact springs is connected with a binding post 60 and also through a wire 61 with a solenoid 62, the core 63 of which has secured to its freely extending end portion, a head 64 which is connected through a link 65 with a crank 66 in turn connected directly to the trunnion 53, whereby passage of an electric current through the winding of the solenoid 62 either draws or maintains the armature in its innermost position and thereby operates to rotate the trunnion 53 so as to maintain the dowser 7 in a raised position in which the rays from the lamp 5 are free to pass toward and through the aperture 4 in the projecting apparatus and from which position said dowser is adapted to fall by gravity to interrupt the passage of said rays upon the cessation of current through said solenoid winding.

The action of gravity upon the dowser 7 is furthermore augmented by the tension of a spring 67 connected at one end to the head 64 of the solenoid core and at its other end 68 secured in any suitable manner to a casing 70 in which the several parts of the dowser actuating and controlling mechanism are housed.

Referring to Fig. 6, there is illustrated a 110 volt line and a 220 volt line running into a gang switch comprising three main blades 71 and an auxiliary blade 72, said switch adapted to be maintained in closed position by means of a suitable coil 73. From the 110 volt line, a wire 74 leads to a normally open starting switch 75 and thence through a normally closed stop switch 76, through the coil 73 and back to the other side of said line. From the wire 74 between the start and stop switches a wire 77 leads to one side of the auxiliary switch 72 physically connected as aforesaid to and movable with the gang switch or blades 71 and thence to that side of the 110 volt line to which the starting switch is directly connected.

From the 110 volt line there also leads a wire 78 to the motor 14 and thence through a suitable toggle or similar switch 79 to the opposite side of said 110 volt line, a tap 80 being taken from the wire 78 between the motor 14 and switch 79 and connecting with the binding post 60 in the casing 70. The spring contact 56, also in said casing, is connected through a wire 81 to that side of the 110 volt line to which the toggle switch 79 is adjacent. A wire 82 leads from the solenoid winding 62 successively through the switches 43, 22 and 18 and thence toward that side of the 110 volt line connected to the auxiliary switch blade 72. The 220 volt line is connected through two of the main switch blades 71 to the light circuit 83 including the lamp 5. A toggle or similar switch 84 is also inserted in that side of the 110 volt line between its connection with the wire 81 and the lead extending to the coil 73.

In the operation of the device with the connections as thus described, it is assumed that the main switch 71—72 is open, 84 closed and 79 open. By closing the normally open starting switch 75 current from the 110 volt line passes through the wire 74 and coil 73, causing said main switch to close, thus causing the lamp 5 to be lighted from the 220 volt circuit through the wires 83, after which the motor 14 is started by manually depressing the handle 52 and thereby raising the dowser 7 out of alignment with the lens of the lamp 5 and the aperture 4 in the projecting apparatus. As the dowser rises to the position shown in Fig. 2, the commutator segment 55 spans the gap between the contact springs 56 and 57 so that the solenoid coil 62 is energized, the core 63 and connected elements maintain the dowser 7 in raised position, and current passes through the wires 78, 80 and 81 and causes the motor to start.

With the apparatus thus running, the lamp 5 is extinguished by either opening the switch 84 or opening the normally closed stop switch 76. On the other hand, with the apparatus running, as before described, the switch 79 is first closed and then the switch 79 is opened to continue the operation of all of the elements and in order that the automatic or manual operation of any one or more of the switches 18, 22 and 43, as hereinbefore described, or the manual return of the dowser 7 to its lowermost position will operate to throw off the lamp and motor. After the switch 84 is closed, with the main switch 71—72 closed, and with the switch 79 likewise open, any one of the switches 18, 22 and 43 will operate to stop the motor and drop the dowser but will not shut off current from the lamp. On the other hand, the simple opening of the normally closed stop switch 76 will extinguish the lamp as well and drop the dowser and stop the motor. Also in the event that the lamp is lighted and the 110 volt power circuit fails, the usual adjusting screw 73' on the main switch actuating coil 73 may be shifted so as to hold said main switch in closed position in order to continue the operation of the lamp and to permit the running of the film driving mechanism manually.

Referring to the diagram in Fig. 7, in addition to the apparatus wired as here shown being operated substantially the same as represented by Fig. 6 by suitable alterations in the main switch connections, it is normally operated as follows:—with the four blade main switch 90 open and the auxiliary switch 91 also open, the normally open starting switch 75 is closed so that current from the 220 volt circuit passes through the wire 92 and coil 93 effecting the closing of the main switch 90 so that current from said 220 volt circuit passes at once into and illuminates the lamp 5, after which the dowser 7 is manually oscillated so as to start the motor 14, as hereinbefore described, from the 110 volt circuit, the lamp being connected to the power main by wires 94 and the motor being connected to the 110 volt main by a wire 95 and to the dowser commutator 54 by a wire 96, a second lead wire 97 connecting the segment 55 of said commutator, when in operative position with the opposite side of said 110 volt circuit.

With the apparatus connected as thus described, the automatic or manual manipulation of any one or more of the switches 18, 22 and 43 will operate to stop the motor or this may be accomplished by manually returning the dowser 7 to its lower position, said switches 18, 22 and 43 as in the previous instance being connected in series and through wires 98, respectively, to one side of the solenoid 62 and to the 110 volt circuit upon the opposite side to that including a blade of the main switch 90. Or, to stop the motor and shut off the current supply to the lamp 5, the stop switch 76 alone may be actuated as hereinbefore described. On the other hand, it is possible with the main switch 90 open to run the motor 14 independently of the lamp 5 by closing the switch 91 and manually shifting the position of the dowser so as to close the gap through the commutator segment 55.

Having thus described my invention, what I claim and desire to protect by Letters Patent of the United States is:—

1. The combination in motion picture projecting apparatus, of film propelling means, a first electric circuit, a motor in said circuit to drive said means, a second circuit, illuminating means in the second circuit, a manually operable dowser for said illuminating means including a make and break device operable with the dowser and located in the first circuit to start the motor, a main switch controlling said first and second circuits, a starting switch also in said first circuit, a solenoid in the first circuit operable as the starting switch is closed to close said main switch and thereby close the second circuit so that movement of the dowser may thereupon start the motor, and an auxiliary switch means adapted to be manually closed when said main switch is closed to operate the motor irrespective of said illuminating means.

2. The combination in motion picture projecting apparatus, of film propelling means, a first electric circuit, a motor in said circuit to drive said means, a second circuit, illuminating means in the second circuit, a manually operable dowser for said illuminating means including a make and break device operable with the dowser and located in the first circuit to start the motor, a main switch controlling said first and second circuits, a starting switch also in said first circuit, a solenoid in the first circuit operable as the starting switch is closed to close said main switch and thereby close the second circuit so that movement of the dowser may thereupon start the motor, an auxiliary switch means adapted to be manually closed when said main switch is closed to operate the motor irrespective of said illuminating means, and a stop switch in one of said circuits so that when the main switch is closed and said auxiliary switch is open, opening of said stop switch causes the opening of said main switch and the instantaneous stopping of said motor, movement of the dowser to operative position, and discontinuance of said light.

3. The combination of motion picture projection apparatus, comprising means to propel the film through a given path, a first electric circuit, a motor in said circuit to drive said propelling means, a second electric circuit, illuminating means in the second circuit, a main switch, controlling said first and second circuits, a manually operable dowser for said illuminating means including a make and break device operable therewith and located in the first circuit, electro-magnetic means in the first circuit to maintain said dowser in inoperative position exposing the illuminating means, a starting switch in the first circuit arranged so that closing thereof also closes said main switch and energizes the illuminating means, an emergency switch in the first circuit, means connected with the emergency switch and operative through failure of the power transmission to release said dowser and stop said motor, and a stop switch also in the first circuit operative when opened to cause the opening of said main switch and the instantaneous stopping of the motor, release of the dowser to operative position, and extinction of the illuminating means.

4. The combination of motion picture projection apparatus, comprising means to propel the film through a given path, a first electric circuit, a motor in said circuit to drive said propelling means, a second electric circuit, illuminating means in the second circuit, a main switch controlling said first and second circuits, a manually operable dowser for said illuminating means including a make and break device operable therewith and located in the first circuit, electro-magnetic means in the first circuit to maintain said dowser in inoperative position exposing the illuminating means, a starting switch in the first circuit arranged so that closing thereof also closes said main switch and energizes the illuminating means, an emergency switch in the first circuit, means connected with the emergency switch and operative through failure of the power mechanism to release said dowser and stop said motor, a second emergency switch in the first circuit, and means connected with the last mentioned switch and likewise operative when actuated by and upon breakage of said film to release said dowser and stop said motor.

5. The combination of motion picture projecting apparatus according to claim 4 wherein a stop switch is located in the first circuit and operative when opened to cause the opening of said main switch and the instantaneous stopping of said motor, release of the dowser to operative position and extinction of the illuminating means.

In testimony whereof I have affixed my signature.

JOSEPH TAVANI.